US006553235B2

(12) United States Patent
Bark et al.

(10) Patent No.: US 6,553,235 B2
(45) Date of Patent: Apr. 22, 2003

(54) METHOD AND APPARATUS FOR PROVIDING ADAPTIVE FAST RADIO CHANNEL CONGESTION CONTROL (75) Inventors: Gunnar Bark, Linköping (SE); Niclas Wiberg, Linköping (SE); Ke Wang Helmersson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/742,346

(22) Filed: Dec. 22, 2000

(65) Prior Publication Data

US 2002/0082023 A1 Jun. 27, 2002

(51) Int. Cl.[7] .................................................. H04Q 7/20
(52) U.S. Cl. ........................................ 455/453; 455/522
(58) Field of Search ................................ 455/453, 522, 455/561, 67.1, 67.7

(56) References Cited

U.S. PATENT DOCUMENTS

| 5,423,062 | A | * | 6/1995 | Sakakura |
| 5,454,026 | A | * | 9/1995 | Tanaka |
| 5,499,386 | A | * | 3/1996 | Karlsson |
| 5,499,395 | A | * | 3/1996 | Doi et al. .................... 370/328 |
| 5,666,356 | A | * | 9/1997 | Fleming et al. ............. 370/230 |
| 5,936,937 | A | * | 8/1999 | Fujita et al. |
| 6,034,971 | A | * | 3/2000 | Love et al. .................. 370/342 |
| 6,052,594 | A | * | 4/2000 | Chuang et al. ............. 370/330 |
| 6,097,700 | A | * | 8/2000 | Thornberg et al. .......... 370/233 |
| 6,118,983 | A | * | 9/2000 | Egusa et al. |
| 6,128,506 | A | * | 10/2000 | Knutsson et al. |
| 6,240,298 | B1 | * | 5/2001 | Hayata |
| 6,324,403 | B1 | * | 11/2001 | Jalloul |
| 6,370,109 | B1 | * | 4/2002 | Schwartz et al. ........... 370/335 |

* cited by examiner

Primary Examiner—Nguyen T. Vo
Assistant Examiner—Nghi H. Ly (57) ABSTRACT

Downlink congestion is accurately detected and congestion control is more effectively provided without decreasing the system downlink capacity. The characteristics of the downlink transmission of the base station are monitored and used to selectively adjust a fast congestion control (FCC) alarm threshold value in each base station. A FCC relief action is initiated upon detecting the downlink power exceeding the FCC alarm threshold value, i.e., potential downlink congestion. The FCC relief action includes temporarily blocking data services in the system or rapidly decreasing the downlink transmit power of the packet data user's Dedicated Physical Channels in the base stations.

21 Claims, 6 Drawing Sheets

METHOD AND APPARATUS FOR PROVIDING ADAPTIVE FAST RADIO CHANNEL CONGESTION CONTROL

BACKGROUND

The present invention relates generally to cellular telecommunication systems, and, more particularly, to a method and system for controlling radio channel congestion in a cellular telecommunications system.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Figure 1:
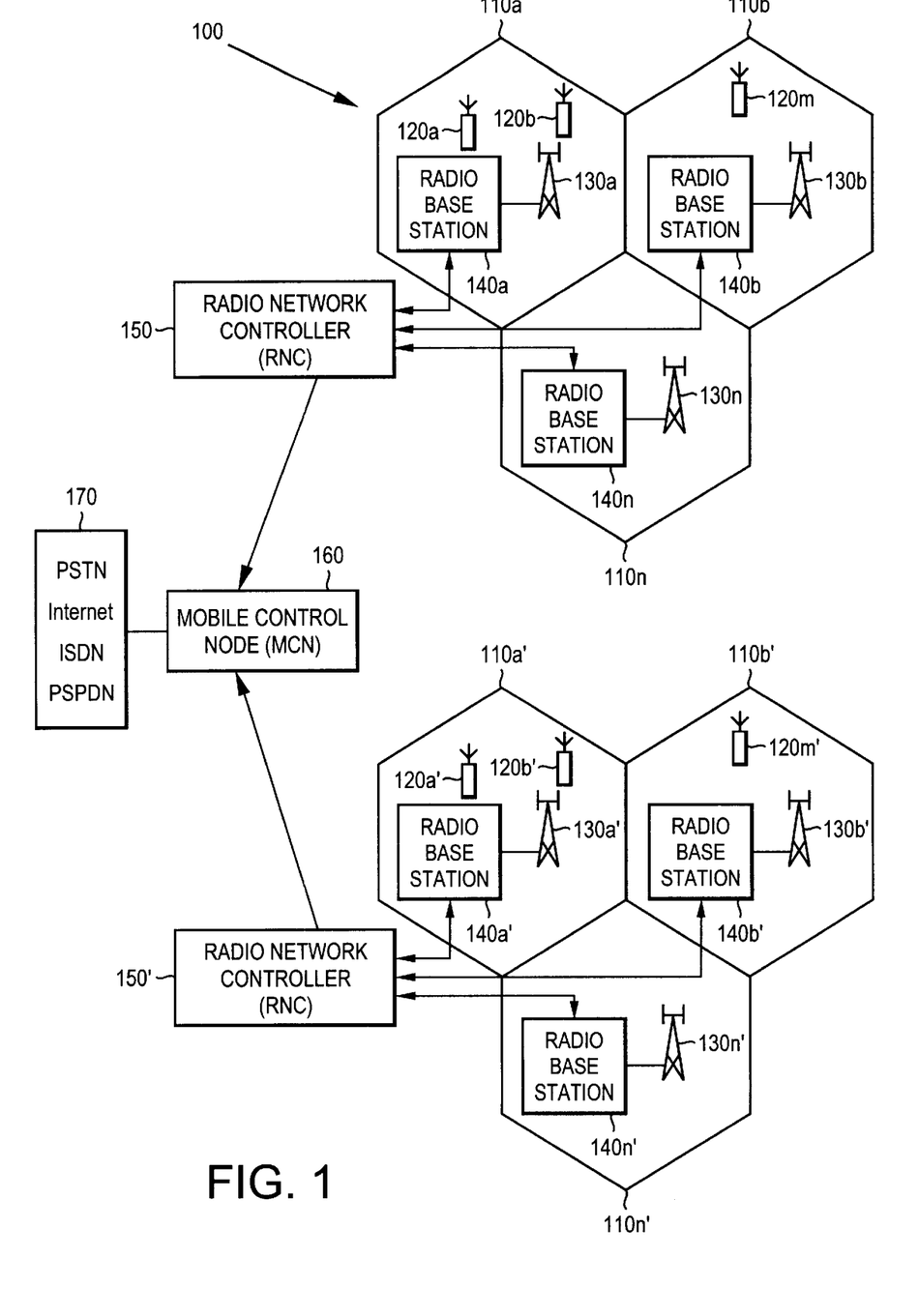
FIG. 1 depicts an exemplary cellular telecommunications system in which the present invention can be implemented.

FIG. 1 is a block diagram that illustrates a cellular telecommunications system 100. The cellular system 100 includes a plurality of radio base stations 140a–n, 140a–n', each being connected to a corresponding antenna 130a–n, 130a–n'. The radio base stations 140a–n, 140a–n', in conjunction with the antennas 130a–n, 130a–n40 , communicate with a plurality of mobile stations (e.g., mobile stations 120a, 120b, 120m, 120a', 120b' and 120m'), which are located in one of the cells 110a–n, 110a–n'. Communication from a base station to mobile stations are transmitted on downlink (DL) radio channels of the base station.

In general, a mobile station communicates with the base station corresponding to the cell in which the mobile station is located or if the system supports soft handovers, a mobile station would communicate with more than one base stations. In FIG. 1, for example, mobile stations 120a and 120b are shown to be communicating with base station 130a. The base stations 130a–n are, in turn, connected to the radio network controller (RNC) 150, whereas the base stations 130a–n' are connected to the RNC 150'. Mobile control node 160 is a switching center that supports the interconnection of the cellular system 100 to a fixed network 170 by landlines or other equivalent connections. The fixed network 170 may comprise a computer-based network (e.g., the Internet), a public switched telephone network (PSTN), an integrated services digital network (ISDN) or a public data network (PSPDN).

As more mobile stations subscribe to these types of systems, the demand for system capacity will increase rapidly, especially in highly populated areas, and one of the most crucial limiting factors for the system DL capacity of the radio channel is the available DL transmit power, $P_{DL\_MAX}$, of the base stations. Thus, for example, if the number of mobile stations being serviced by a given base station is excessive, the base station may not have sufficient DL transmit power available to provide effective support. Consequently, mobile stations may experience transmission delays and unserved requests due to the congestion of the radio channel.

Therefore, a need exists for a method and system for monitoring potential radio channel congestion and for relieving congestion on one or more radio channels of a cellular system.

SUMMARY

The present invention involves method and system for monitoring potential congestion on radio channels, and when appropriate, relieving the radio channel congestion. In general, the present invention accomplishes this through the use of a radio channel congestion alarm that continuously monitors DL transmit power of a base station and compares the current DL transmit power level to an alarm threshold value. The alarm threshold value, in turn, is adaptively adjusted as a function of the variation over time in DL transmit power of the base station. By adaptively adjusting the alarm threshold value based on the variation over time of the DL transmit power, the method and/or system of the present invention monitors potential radio channel congestion based on the behavior of DL transmit power, which increases the accuracy of the congestion alarm, improves the congestion relief and enhances the system capacity.

When appropriate, the present invention relieves radio channel congestion using a congestion controller. The congestion controller is divided into a fast congestion controller (FCC) located in the base station and a slow congestion controller (SCC) located in a radio network controller. The FCC performs rapid congestion relief actions to mitigate DL radio channel congestion until the SCC permanently resolves DL radio channel congestion.

Accordingly, it is an object of the present invention to more accurately detect potential DL radio channel congestions.

It is another object of the present invention to eliminate false congestion alarms and unnecessary capacity limiting actions.

It is yet another object of the present invention to provide fast congestion relief actions upon detecting potential DL radio channel congestion.

It is another object of the present invention to efficiently relieve DL radio channel congestion without decreasing the system DL capacity.

In accordance with one embodiment of the present invention, the above-identified and other objectives are achieved by a base station comprising a FCC. The FCC monitors potential radio channel congestions by monitoring characteristics of the DL transmission on radio channels of the base station. The FCC comprises a congestion alarm having an alarm threshold value that is adaptively adjusted based on the characteristics of DL transmission. Specifically, the variation over time of the DL transmit power is determined and used to adjust the FCC alarm threshold value. Further, the FCC alarm threshold value can be adaptively adjusted with respect to the variation over time of the DL transmit power, the detected number of users and their offered bit rates.

Further, according to exemplary embodiments of the present invention, upon detecting radio channel congestions, methods and systems for relieving radio channel congestions include temporarily blocking data services in the system. Specifically, when the base station is not servicing any packet data user, the system then temporarily reduces the maximum transmit power allowed for all users' downlink dedicated physical channels (DPCHs). However, when there are packet data users serviced by the base station, the system then temporarily blocks packet data services by rapidly decreasing transmit power of the packet data users' downlink DPCHs.

BRIEF DESCRIPTION OF THE FIGURES

The objectives and advantages of the present invention will be understood by reading the following detailed description in conjunction with the drawings, in which.

DETAILED DESCRIPTION

In the following description, for purposes of explanation and not limitation, specific details are set forth, such as particular devices or techniques, etc. in order to provide a thorough understanding of the present invention. However, it will be apparent to one skilled in the art that the present invention may be practiced in other embodiments that depart from these specific details. In other instances, detailed descriptions of well-known methods, systems and devices are omitted so as not to obscure the description of the present invention The exemplary cellular telecommunications system discussed herein is described as employing a wide-band code division multiple access (WCDMA) protocol. However, those skilled in the art will appreciate that the present invention may be implemented in systems that employ other protocols, including, but not limited to time division multiple access (TDMA), frequency division multiple access (FDMA), or some hybrid of any of the above protocols. Likewise, the exemplary embodiments described herein relate to the Global System for communication (GSM) system or the Digital Advanced Mobile Phone Service (DAMPS) system; however, the present invention is not so limited and is applicable to radio base stations in any system.

Figure 2:
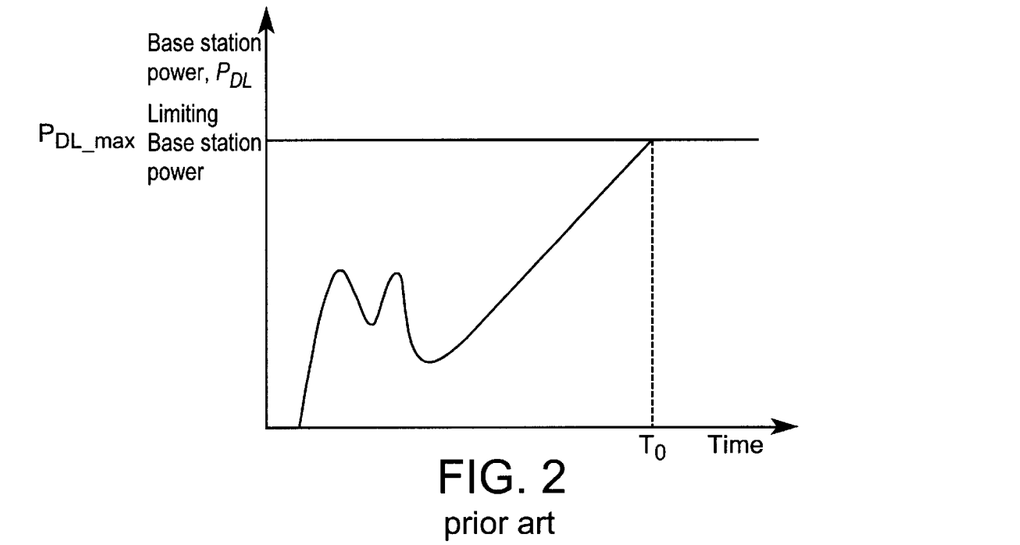
FIG. 2 illustrates the downlink power time plot of a conventional base station that employs no radio channel congestion control.

FIG. 2 illustrates the DL power time plot of a conventional base station in a cellular telecommunications system 100, that does not employ any form of radio channel congestion control. Without radio channel congestion control, a base station can easily encounter DL transmission power shortages if (1) too many mobile stations are being serviced by the base station; (2) the mobile stations as a group are requesting DL bit rate services that exceed the capabilities of the base station; or (3) the mobile stations as a group require an amount DL transmit power that exceeds the maximum DL power capability, $P_{DL\_MAX}$, of the base station due to excessive path losses or increased radio channel interference. As shown in FIG. 2, the DL transmit power level, $P_{DL}$, fluctuates over time. Moreover, this fluctuation is random. At some point in time, for example, time $T_0$, $P_{DL}$ may equal or exceed $P_{DL\_MAX}$. Should this occur, the quality of the connections, and particularly the DL connections between the base station and the various mobile stations being serviced by the base station, may be jeopardized.

As one skilled in the art will appreciate, a base station has the ability to track the number of mobile stations it is servicing, as well as the bit rates associated with each connection. Moreover, the cellular system, and more particularly, the corresponding RNC, has the ability to regulate the number of mobile stations that are being serviced by the base station and the bit rates associated with the connections. Accordingly, the cellular system can, if necessary, limit the required amount of $P_{DL}$ associated with a given base station by regulating the number of mobile stations and the bit rates associated with the various connections.

Figure 3:
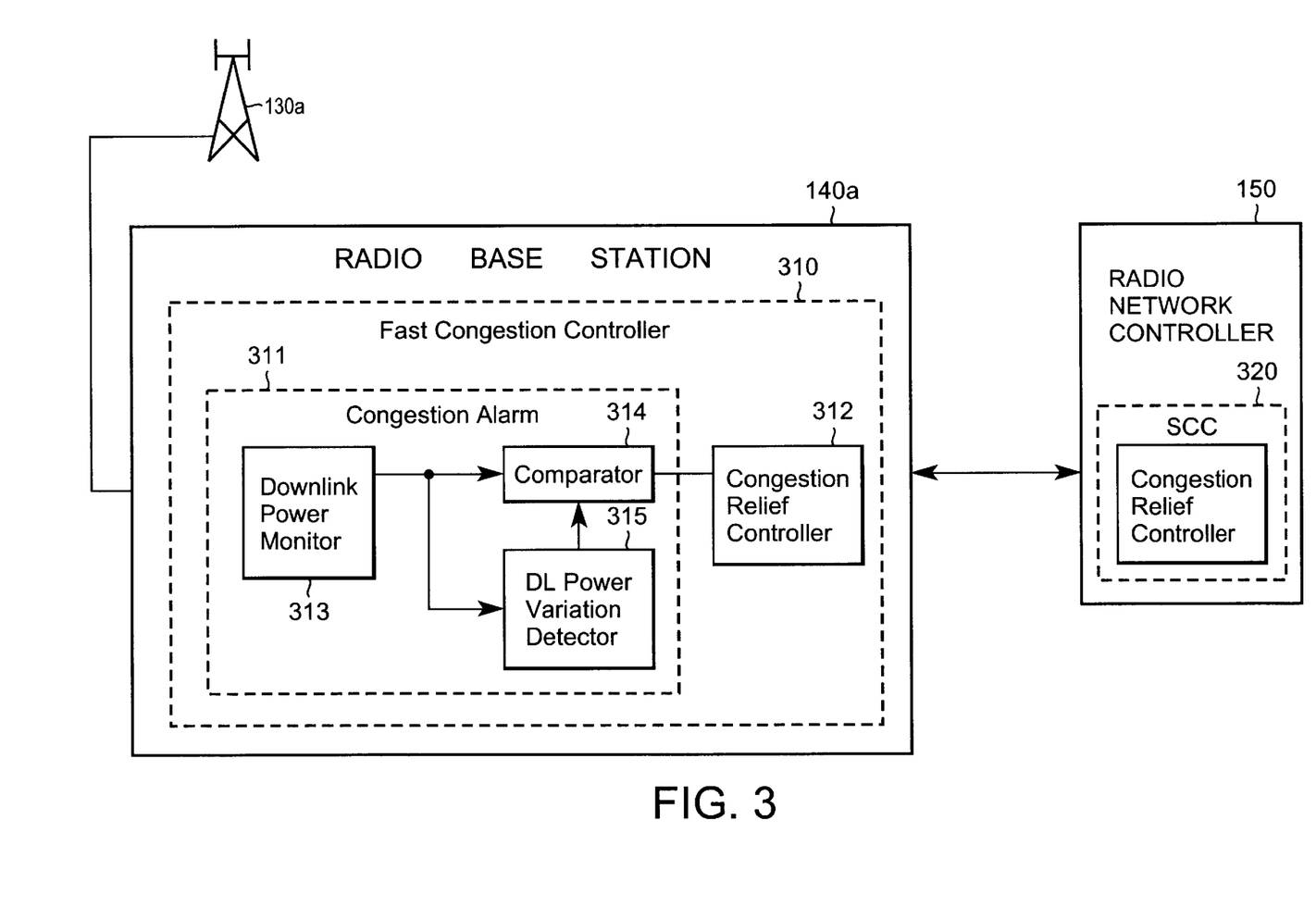
FIG. 3 illustrates a system having a congestion controller.

FIG. 3 is a block diagram of a radio base station 140a and a radio network controller 150 which are capable of regulating the number of mobile stations and the bit rates associated with the radio base station 140a, in accordance with exemplary embodiments of the present invention. As shown, the radio base station 140a includes a fast congestion controller (FCC) 310, while the radio network controller 150 includes a slow congestion controller (SCC) 320. The FCC 310 in base station 140a comprises a congestion alarm 311 and a congestion relief controller 312. The FCC monitors potential radio channel congestion using the congestion alarm 311 and relieves radio channel congestion using the congestion relief controller 312.

In the embodiment illustrated in FIG. 3, the congestion alarm 311 employs a DL transmit power monitor 313. In fact, as will be appreciated by those skilled in the art, the measurement of $P_{DL}$ is available via base station measurements, as specified by the UMTS standard, and can be obtained either in the base station or the corresponding RNC. However, to reduce the amount of signaling and time delay, the DL transmit power monitor and the fast congestion detection is thus preferably in the base station.

After the DL transmit power monitor 313 obtains $P_{DL}$, it forwards the value to a comparator 314 and to a DL power variation detector 315. The comparator 314 compares $P_{DL}$ to a congestion alarm threshold value, $FCC_{AL\_THRES}$, for the purpose of detecting potential radio channel congestion. In general, radio channel congestion exists if it is determined that $P_{DL}$ is greater than or equal to $FCC_{AL\_THRES}$, where radio channel congestion is associated with a potential DL power shortage.

The $FCC_{AL\_THRES}$ is always less than $P_{DL\_MAX}$ and, as stated, it is adaptively adjusted as a function of the variation of the DL transmit power, in accordance with exemplary embodiments of the present invention. The variation of $P_{DL}$ is determined by the DL power variation detector 314. In a preferred embodiment, the DL power variation detector 315 determines the variation over time of $P_{DL}$ based on the standard deviation of the DL transmit power, $std[P_{DL}]$. The DL power variation detector 315, in turn, derives $std[P_{DL}]$ based on the most current and prior measurements of $P_{DL}$.

The FCC alarm threshold value $FCC_{AL\_THRES}$ determines when the SCC in the RNC is notified that radio channel congestion exists and a potential DL power shortage. The FCC alarm threshold value, $FCC_{AL\_THRES}$, also determines how fast the SCC needs to take action to relieve radio channel congestion before existing connections are dropped. Thus, for example, if the FCC alarm threshold value is set too high, the DL transmit power would reach the limiting power too often, resulting in bad quality for many users and a lot of wasted signaling within the network. On the other hand, if the FCC alarm threshold value is set too low, the base station will send false alarms to the SCC, which unnecessarily lowers the DL bit rates and, in worst case, drops existing connections when it is not necessary. This would decrease the system DL capacity. For these very reasons, $FCC_{AL\_THRES}$ is derived as a function of the variation in $P_{DL}$.

As stated, $FCC_{AL\_THRES}$ is adaptively set as a function of the variation in $P_{DL}$, and in accordance with a preferred embodiment, the variation in $P_{DL}$ is measured in terms of $std[P_{DL}]$. For example, if the $std[P_{DL}]$ is low, $P_{DL}$ is relatively remain stable, $FCC_{AL\_THRES}$ may be set to a higher value. In contrast, if the $std[P_{DL}]$ is high, $P_{DL}$ is less stable and less predictable. Thus, $FCC_{AL\_THRES}$ is set to a lower value.

Figure 4:
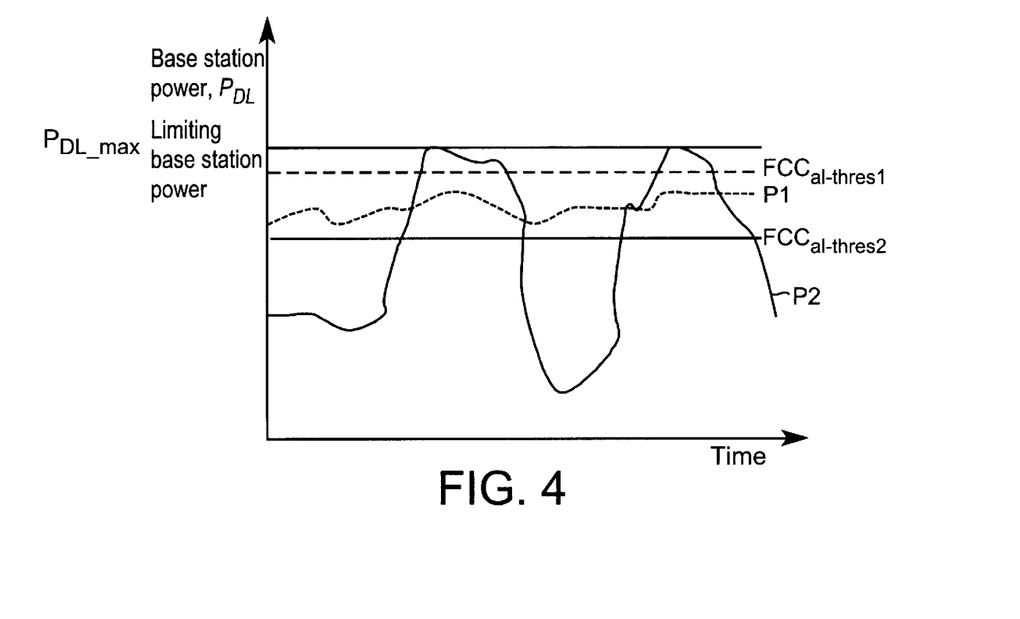
FIG. 4 illustrates the downlink power time plot of a base station a system having congestion controller in accordance with an exemplary embodiment of the present invention.

In FIG. 4, P1 and P2 represent two different DL transmit power plot over time, where the variation associated with P2 is clearly less than the variation association with P2. The relatively steady behavior of P1, as compared with P2, reflects a higher degree of predictability. It also reflects a lower probability that $P_{DL}$ will suddenly increase and cause a DL transmit power shortage. Accordingly, the alarm threshold associated with P1 can be set to a higher level as compared to the alarm threshold associated with P2.

Figure 5A:
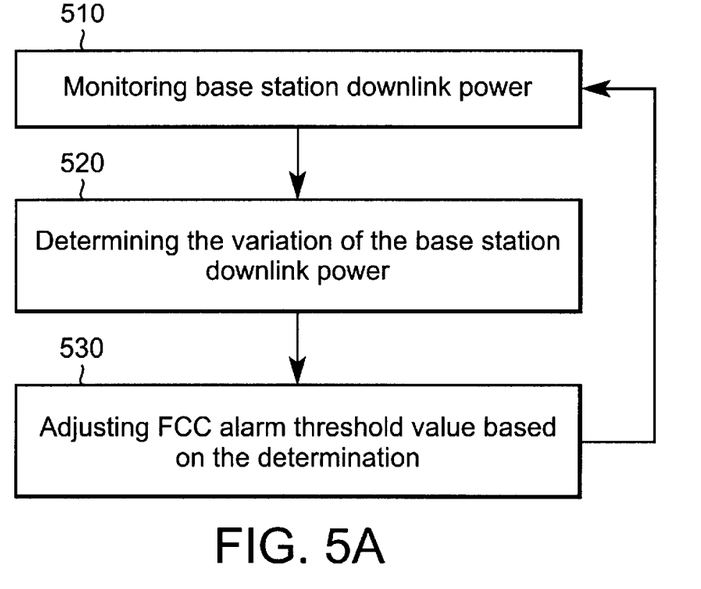
FIG. 5a illustrates a method for adaptively adjusting the fast congestion controller in accordance with an exemplary embodiment of the present invention.

FIG. 5a illustrates a method for adaptively adjusting the FCC alarm threshold value in a cell in accordance with exemplary embodiments of the present invention. Initially, $P_{DL}$ of each base station is monitored over a period of time (Step 510). $P_{DL}$ of each base station is monitored using known methods. Based on measured values of $P_{DL}$, the variation of the base station $P_{DL}$ is determined (Step 520). With a preferred embodiment, $P_{DL}$ variation is determined as a function of standard deviation. The FCC alarm threshold in the base station is then adaptively set based on the variation of the DL transmit power (Step 530). The aforementioned method (i.e., steps 510-520-530) is periodically repeated. As will be appreciated by those skilled in the art, the FCC alarm threshold value, $FCC_{AL\_THRES}$, can be adjusted by the base station, the corresponding RNC or an external operation and maintenance node.

Further in accordance with an exemplary embodiment of the present invention, the FCC alarm threshold value $FCC_{AL\_THRES}$ may be adaptively set according to the relationship of equation 1 below:

$$FCC_{AL\_THRES} = P_{DL\_MAX} - C_1 \cdot std[P_{DL}], \quad \text{(equation 1)}$$

where $P_{DL\_MAX}$ is the maximum $P_{DL}$ associated with the base station, $C_1$ is a constant set by, for example, a system operator, and $std[P_{DL}]$ is the standard deviation of the total DL transmit power of the base station.

Figure 5B:
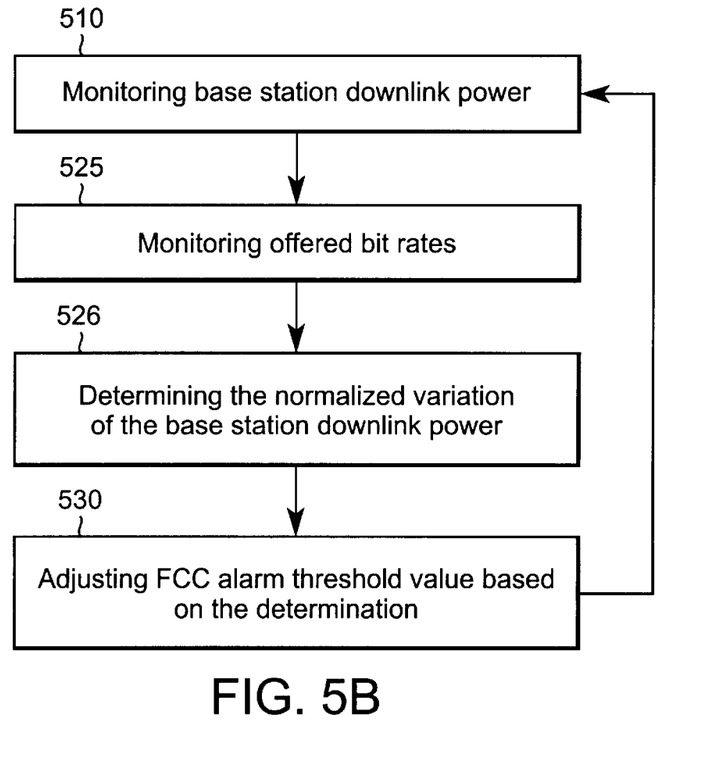
FIG. 5b illustrates a method for adaptively adjusting the fast congestion controller in accordance with another exemplary embodiment of the present invention.

As discussed above, the base station has the ability to track the number of mobile stations it is servicing, as well as the bit rates associated with each connection. FIG. 5b illustrates a method for continuously adjusting the FCC alarm threshold value in a cell in accordance with an alternative embodiment of the present invention. Similar to the method depicted in FIG. 5a, initially, $P_{DL}$ of each base station is monitored over a period of time (Step 510). In addition, the offered bit rates associated with each mobile station in the cell is monitored (Step 525). Based on measured values of $P_{DL}$, the normalized variation of the base station $P_{DL}$ i.e., variation with respect to the detected number of users and their offered bit rates, is determined (Step 526). The FCC alarm threshold in the base station is then adaptively set based on the normalized variation of the DL transmit power (Step 530). The aforementioned method (i.e., steps 510-525-526-530) is periodically repeated.

Further in accordance with an exemplary embodiment of the present invention, the FCC alarm threshold value $FCC_{AL\_THRES}$ may be adaptively set according to the relationship of equation 2 below:

$$FCC_{AL\_THRES} = P_{DL\_MAX} - C_2 \cdot std[P_{DL}/n_{bit}], \quad \text{(equation 2)}$$

where $FCC_{lim\_thres}$ is the upper limit for the base station power, $C_2$ is a second constant, and $n_{bit}$ is the sum of all bits transmitted to the mobile stations in the cell during the same time the $P_{DL}$ is averaged over, e.g., a 10 ms frame. For example, if the base station is currently servicing 3 mobile stations and the base station observes that the number of bits transmitted to each mobile station over the given time frame 100, 150 and 80 bits, respectively, then $n_{bit}$, would be 330 bits.

Figure 5C:
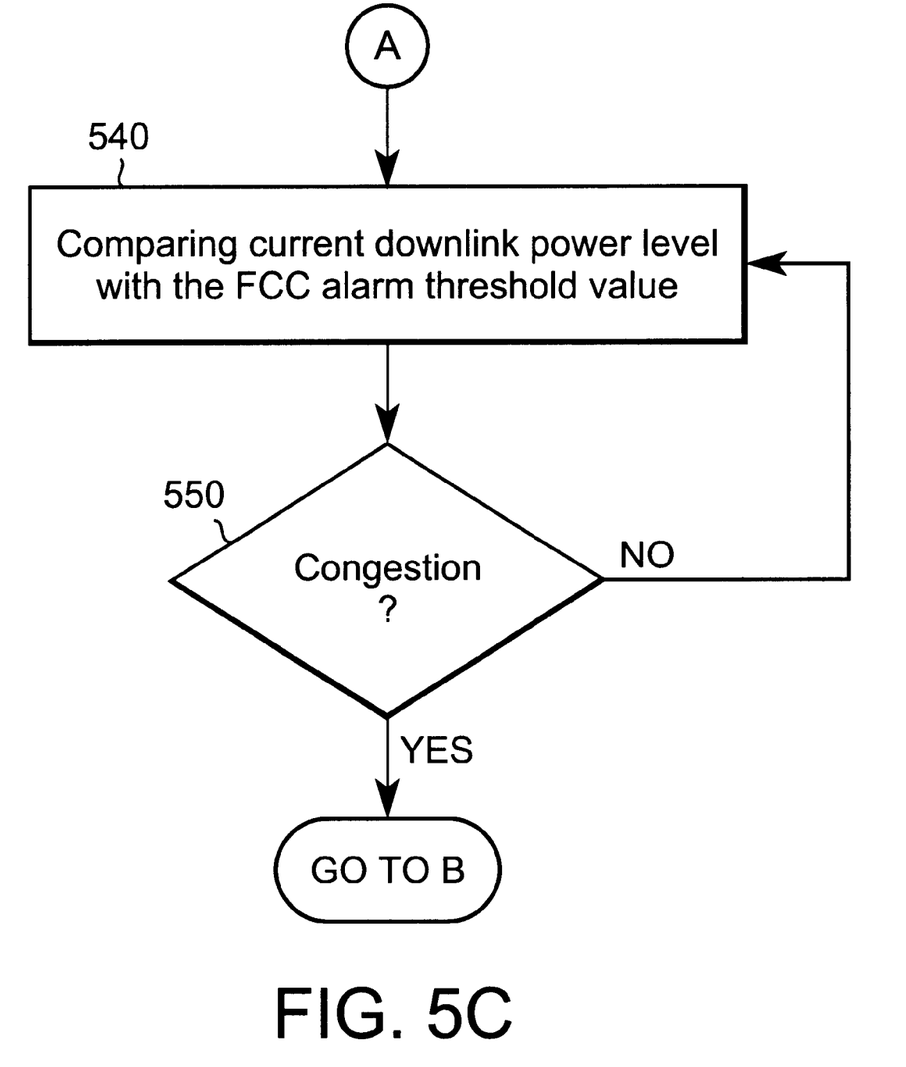
FIG. 5c illustrates a method for detecting potential radio channel congestion in accordance with another exemplary embodiment of the present invention.

FIG. 5c illustrates a method for detecting potential DL radio channel congestions in accordance with an alternative embodiment of the present invention. After adaptively setting the $FCC_{AL\_THRES}$ in accordance with the methods illustrated in FIG. 5a or FIG. 5b, the current $P_{DL}$ is compared to $FCC_{AL\_THRES}$ (Step 540). Based on the comparison, a determination is made as to whether the cell is experiencing radio channel congestion (Step 550). Thus, for example, if it is determined that $P_{DL} \leq FCC_{AL\_THRES}$, then a determination is made that the cell is not currently experiencing radio channel congestion. However, if it is determined that $P_{DL} \geq FCC_{AL\_THRES}$, then a determination is made that the cell is currently experiencing radio channel congestion, wherein the RNC may be notified so that it can quickly resolve the radio channel congestion, as described in greater detail below.

Figure 6:
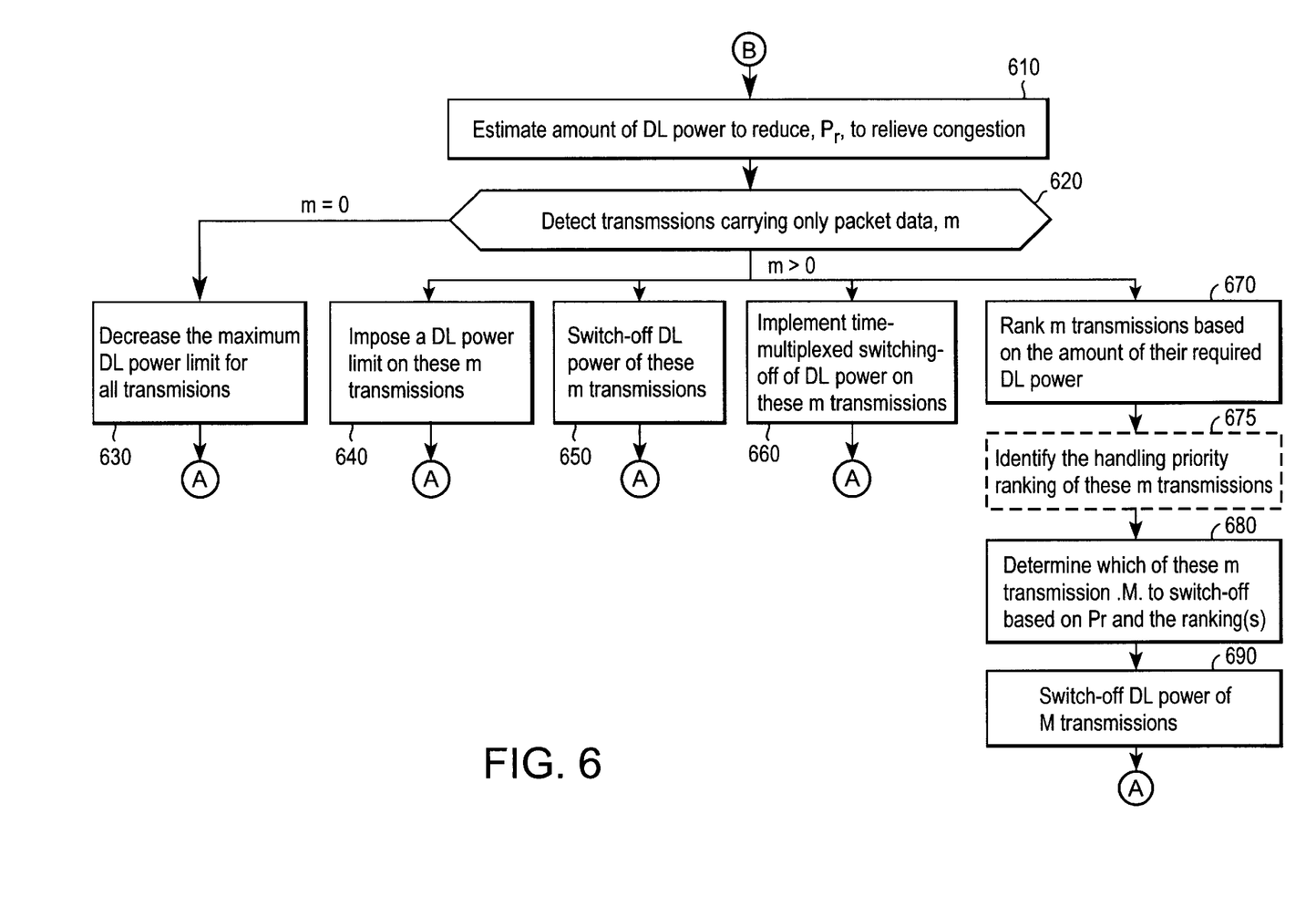
FIG. 6 illustrates methods for relieving radio channel congestion in accordance with exemplary embodiments of the present invention.

FIG. 6 illustrates a method for fast congestion control in accordance with exemplary embodiments of the present invention. If the cell is determined to be experiencing radio channel congestion, for example, in accordance with the method illustrated in FIG. 5c, the FCC in the base station then preferably determines the severity of the radio channel congestion, i.e., how much of $P_{DL}$ to reduce, $P_r$, for relieving radio channel congestion (Step 610). The estimation of $P_r$ can be made based on the difference between $P_{DL}$ and $FCC_{AL\_THRES}$ values. $P_r$ can then be used as one of the measures for providing the fast congestion relief action. Alternatively, a hysteresis H1 may also be employed in the estimation of $P_r$ to further ensure the effectiveness of the fast congestion relief action. For example, $P_r$ can be estimated based on the difference between $P_{DL}$ and ($FCC_{AL\_THRES}$-H1). Also, rather than making an estimation, as one skilled in the art will appreciate, $P_r$ needs not be estimated but can be set to a fixed value by system administrators.

After determining the severity of the radio channel congestion, the FCC then provides the fast congestion relief action by temporarily blocking data services in the system. As will be appreciated by those skilled in the art, the base station can identify transport channels carrying packets for each mobile station as specified by the TS standard. Moreover, by identifying the transport channels, the base station can identify what type of data services being provided for each mobile station. For instance, the transport channels can have their Radio Link Control (RLC) mode set to "Acknowledged," "Transparent," or "Unacknowledged" mode. The "Acknowledged" mode would indicate packet data being transmitted on the channel while the "Transparent" mode would indicate speech data being transmitted on the channel and the "Unacknowledged" mode would indicate internal signalling messages being transmitted on the channel. Since transmissions such as the speech data and internal signalling messages are essential to maintaining mobile stations' connection, transmission in "Transparent" or "Unacknowledged" mode is preferably not be interrupted. However, when transmissions in 'Acknowledged' mode is temporarily blocked, the mobile stations would only experience lost or erroneous data packets, rather than losing existing connections.

Therefore, to avoid undesirable interruptions, the FCC attempts to detect transmissions that are carrying only packet data, m (Step 620). For example, the FCC can detect transmissions that are carrying only packet data by identifying transmission that are only in 'Acknowledged' mode.

If there are no packet users detected, i.e., m=0, then a determination is made that transmissions are equally important and the FCC temporarily reduces the maximum DL power limit for all mobile stations (Step 630). Typically, a base station attempts to maintain a predetermined signal quality for all mobile stations which it serves regardless their locations. For instance, mobile station 120a can locate further away from the base station than mobile station 120b but mobile station 120a would still have the same received signal quality as mobile station 120b. That is the base station would need to utilize a higher transmit power on the DPCHs for mobile station 120a. According to the TS standard, a base station would receive a system maximum limit given by the RNC such that its entire capacity would not be exhausted by one mobile station. Therefore, according to the present invention, the maximum limit given by the RNC is temporarily reduced by the FCC and the reduced maximum limit is used to further restrict the DL transmit power of each mobile station's DPCH. Subsequently, some mobile stations, especially those demand higher transmit power, would be affected by the reduced maximum DL power limit. Therefore, some of the $P_{DL}$ of the base station would be free and thereby, relieving the radio channel congestion. More particularly, the maximum DL power limit needs to be reduced only by the amount that would decrease $P_{DL}$ by $P_r$ to effectively provide the fast congestion relief action.

However, if the FCC determines that m>0, i.e., there exists transmissions which are more tolerant to communication errors, these more tolerant transmissions m would be modified first.

Similar to reducing the maximum DL power limit for all mobile users, the FCC can impose a limit on the DL transmit power only on these more tolerant m transmissions (Step 640). Thus, according to another embodiment of the present invention, to relieve the radio channel congestion, the FCC temporarily self-imposes an additional maximum limit on the DL transmit power on these m transmissions. This self-imposed limit is intended to be much smaller than the system maximum DL power limit. Thus, mobile stations that are only receiving packet data and especially those demand higher power are affected by this self-imposed limit. Therefore, some of the $P_{DL}$ of the base station would be free and thereby, relieving the radio channel congestion.

Alternatively, the FCC can switch off the transmit power of these more tolerant m transmissions (Step 650). As will be appreciated by those skilled in the art, the DPCH comprises the dedicated physical data channel (DPDCHs) and the dedicated physical control channels (DPCCHs). According to one embodiment of the present invention, the FCC only switches off the DL transmit power for the DPDCHs of these m transmission, such that the DL transmit power for the DPCCHs of these m transmissions remains affected. Therefore, the signalling on the DPCCHs, e.g., power control and downlink channel estimation performed by the mobile stations, is unaffected and maintained. Alternatively, the FCC can switch off the DL transmit power for both the DPDCHs and DPCCHs of these m transmission in order to relieve the radio channel congestion.

Yet, according to another embodiment of the present invention, the FCC can implement a time-multiplexed switching-off on these more tolerant m transmission (Step 660). Thus, a set of these m transmissions would be switched off for a short time period, e.g., during a frame of 10 ms, and another set of these m transmissions would then be switched off for a short time period that follows. Therefore, these m transmissions are switched off in a time-multiplexed manner and the drawbacks, such as data packet delays, are spread out among these m transmissions.

Alternatively, to even further ensure the effectiveness of the fast congestion relief action, these m transmissions can be ranked based on their required DL transmit power (Step 670). Thus, if a mobile station is located far away from the base station, it is likely to require a higher DL transmit power to compensate path loss due to its longer distance from the base station. In such situations, these mobile stations which are located further away from the base station would rank higher such that switching off these connections that demanding higher DL transmit power is more effective to relief the overall radio channel congestion.

Optionally, in selecting the dropping of transmissions, the "frame handling priority", which shows the priority of each dedicated transport channel, can also be taken into the consideration (Step 675). This handling priority is determined by administrators and signaled from the RNC to the base station. The system administrators can pre-arrange the order for transmission dropping since some users may possess preferred transmission statuses.

After obtaining the ranking(s) of each m transmission, a determination on which specific transmissions to modify is made (Step 680). Specifically, a determination is made as the number of first M transmissions of the ranking to be switched to zero until Pr amount is reduced from $P_{DL}$. Thus, the number of transmission switched off is reduced to the minimum. Upon determining which M transmissions, the DL transmit power of these M transmissions is set to zero (Step 690).

Similarly to the switching off of m transmissions depicted in Step 650, the FCC can only switch off the DL transmit power for the DPDCHs of these M transmission, such that the DL transmit power for the DPCCHs of these M transmissions remains affected. Therefore, the signalling on the DPCCHs, e.g., the uplink power control and channel estimation performed by the mobile stations, is unaffected and maintained. Alternatively, the FCC can switch off the DL transmit power for both the DPDCHs and DPCCHs of these M transmissions to relieve the radio channel congestion.

The present invention provides a number of advantages. For example, by implementing the configuration illustrated in FIG. 3, the FCC radio channel congestion alarm is sent to the SCC in the RNC only when there is a high likelihood of DL radio channel congestion. Accordingly, SCC congestion relief is not initiated unless the base station is experiencing, or is expected to experience, a DL transmit power shortage. This, in turn, increases the DL capacity of the base station because false congestion alarms and unnecessary capacity limiting actions are minimized.

Moreover, since the mobile stations having only data transmissions are fairly insensitive to lost or erroneous data packets transmissions, the radio congestion relief action by the FCC modifies the DL transmit power of these mobile stations without causing significant transmission degradation. Therefore, the mobile stations would only experience lost or erroneous data packets, which only temporarily preventing the mobile stations from receiving or placing a telephone call from receiving data and resulting a small packet delay. In addition, once the DL transmit power is changed back on after the resolution of the congestion, these temporarily-blocked packet data would then be resent to the mobile stations such that the information would only be delayed and not lost by this congestion relief action. This is considered to be a more favorable alternative to receiving bad DL quality on connections without retransmissions (like speech and streaming), or losing existing connections.

It should be noted that the present invention has been described in accordance with exemplary embodiments, which are intended to be illustrative in all aspects, rather than restrictive. Thus, the present invention is capable of many variations in detailed implementation, which may be derived from the description contained herein by a person or ordinary skill in the art. All such variations are considered to be within the scope and spirit of the present invention as defined by the following claims.

What is claimed is:

1. A base station comprising:
   means for providing channel control including an alarm which detects channel congestion; and
   means for providing congestion relief upon detecting channel congestion, wherein said alarm includes:
   means for monitoring at least one of a plurality of characteristics of downlink transmission on radio channels of the base station;
   means for comparing said at least one of characteristics of downlink transmission and a threshold value of said alarm; and
   means for selectively adjusting said threshold value based on the detected characteristics of the downlink transmission.

2. The base station of claim 1, wherein said alarm further comprises:
   means for determining the variation over time of the downlink transmit power of the base station.

3. The base station of claim 1, wherein said alarm further comprises:
   means for tracking number of users serviced by the base station and number of the users's offered bit rates; and
   means for determining the variation over time of the downlink transmit power of the base station with respect to said offered bit rates.

4. The base station of claim 1, wherein said means for providing congestion relief comprises:
   means for temporarily blocking downlink transmission on said radio channels.

5. The base station of claim 4, wherein said means for providing congestion relief further comprises:
   means for receiving a maximum downlink power limit for said radio channels; and
   means for decreasing said maximum downlink power limit.

6. The base station of claim 4, wherein said means for providing congestion relief further comprises:
   means for identifying channels carrying only packet data; and
   means for imposing a maximum downlink power limit on said channels carrying only packet data.

7. The base station of claim 4, wherein said means for providing congestion relief further comprises:
   means for identifying channels carrying only packet data; and
   means for switching off downlink transmit power of said channels carrying only packet data.

8. The base station of claim 4, wherein said means for providing congestion relief further comprises:
   means for identifying channels carrying only packet data; and
   means for implementing a time-multiplexed switching-off downlink transmit power on said channels carrying only packet data.

9. The base station of claim 4, wherein said means for providing congestion relief further comprises:
   means for identifying channels carrying only packet data;
   means for estimating a ranking for each of said channels carrying only packet data; and
   means for switching off downlink transmit power of said channels carrying only packet data in the order of the ranking until congestion is relieved.

10. The base station of claim 1 further comprising:
    means for notifying a radio network controller of the detected channel congestion.

11. A method for monitoring transmission congestions in a radiocommunication system, the method comprising the steps of:
    monitoring at least one of a plurality of characteristics of downlink transmission on radio channels of a base station;
    selectively adjusting a threshold value based on the detected characteristics of the downlink transmission;
    comparing said at least one of a plurality of characteristics of downlink transmission and said threshold value; and
    determining the variation over time of the downlink transmit power of the base station.

12. The method of claim 11, further comprising the steps of:
    tracking number of users serviced by the base station and number of the users' offered bit rates; and
    determining the variation over time of the downlink transmit power of the base station with respect to said offered bit rates.

13. The method of claim 11, wherein said monitoring at least one of a plurality of characteristics of downlink transmission is at the base station.

14. The method of claim 11, wherein said monitoring at least one of a plurality of characteristics of downlink transmission is at a radio network controller.

15. A method for relieving transmission congestions in a base station of a radiocommunication system, the method comprising the steps of:
    monitoring at least one of a plurality of characteristics of downlink transmission on radio channels of a base station;
    selectively adjusting a threshold value based on the detected characteristics of the downlink transmission;
    comparing said at least one of a plurality of characteristics of downlink transmission and said threshold value; and
    temporarily blocking downlink transmission on radio channels of the base station based on the comparing step.

16. The method of claim 15, further comprising the step of:
    notifying a radio network controller of the transmission congestions.

17. The method of claim 15, further comprising the steps of:
    receiving a maximum downlink power limit for said radio channels; and
    decreasing said maximum downlink power limit for said radio channels.

18. The method of claim 15, further comprising the steps of:
    identifying channels carrying only packet data; and
    imposing a maximum downlink power limit on said channels carrying only packet data.

19. The method of claim 15, further comprising the steps of:

identifying channels carrying only packet data; and switching off downlink transmit power of said channels carrying only packet data.

20. The method of claim 15, further comprising the steps of:

identifying channels carrying only packet data; and implementing a time-multiplexed switching-off downlink of transmit power on said channels carrying only packet data.

21. The method of claim 15, further comprising the steps of:

identifying channels carrying only packet data;

estimating a ranking for each of said channels carrying only packet data; and switching off downlink transmit power of said channels carrying only packet data in the order of the ranking until congestion is relieved.

* * * * *